United States Patent [19]

Kondoh et al.

[11] Patent Number: 5,222,816
[45] Date of Patent: Jun. 29, 1993

[54] ROLLING BEARING WITH SOLID LUBRICANT

[75] Inventors: Hiromitsu Kondoh; Hiroshi Yamada; Takahiro Mizutani, all of Kuwana; Norihide Satoh, Mie, all of Japan

[73] Assignee: NTN Corporation, Osaka, Japan

[21] Appl. No.: 952,125

[22] Filed: Sep. 28, 1992

[30] Foreign Application Priority Data

Oct. 30, 1991 [JP] Japan .................................. 3-283407

[51] Int. Cl.⁵ ............................................ F16C 33/66
[52] U.S. Cl. .................................. 384/463; 384/492; 384/908
[58] Field of Search ................... 384/492, 463, 908

[56] References Cited

U.S. PATENT DOCUMENTS

| | | | |
|---|---|---|---|
| 3,001,838 | 9/1961 | Lamson et al. | 384/463 |
| 4,582,368 | 4/1986 | Fujita et al. | 384/908 X |
| 4,666,787 | 5/1987 | Bickle et al. | 384/908 X |
| 4,923,761 | 5/1990 | Shindo | 384/463 X |

Primary Examiner—Thomas R. Hannon
Attorney, Agent, or Firm—Nikaido, Marmelstein, Murray & Oram

[57] ABSTRACT

The raceway surfaces of inner ring 1 and outer rings 2 and the surfaces of rolling elements are respectively formed with solid lubricating films 1a, 2a and 3a of PTFE whose average molecular weight is not more than 5,000.

These solid lubricating films each have a continuous island distribution comprising island film portions 5 and connective film portions 6 interconnecting the island film portions 5.

12 Claims, 5 Drawing Sheets

ROLLING BEARING WITH SOLID LUBRICANT

BACKGROUND OF THE INVENTION

The present invention relates to a rolling bearing with solid lubricant suitable for use particularly in semiconductor producing apparatuses.

Rolling bearings used in semiconductor producing apparatuses are operated in vacuum requiring a high degree of cleanliness, and hence for lubrication thereof, solid lubricants including laminar materials such as molybdenum disulfide, soft metals such as gold, silver and lead, and high polymers such as PTFE and polyimide are in general use.

Recently, in the semiconductors production field, as the degree of integration of semiconductors increases, the line width of electric circuits has been decreasing. And since it is feared that particles of a solid lubricant occurred from the bearing may adhere to the patterns to short the electric circuits, solid lubricants of soft metal type tend to be hardly employed because of those electrical conductivity. On the other hand, such solid lubricants as molybdenum disulfide and PTFE, though having no electrical conductivity, have little re-adherebility and low resistance; thus, they are inferior in durability to soft metals. Further, recent semiconductor producing apparatus requires not only a bearing which can be used in vacuum but also a bearing which can be used in both air and vacuum and which produces little dust and has corrosion resistance.

More particularly, it is mainly in the wafer treating process that vacuum bearings are used in the semiconductor producing process. And the apparatus used in this process tends to be made an in-line form for purpose of increasing productivity, and the wafer transporting system requires a bearing which can be operated in both air and vacuum. Further, the increased degree of integration of semiconductors necessarily requires to suppress dust discharged from the apparatus. Further, corrosion resistance and heat resistance are also required depending upon locations where bearings are used.

With the above in mind, the present applicant has already applied for patent (Japanese Patent Application No. 190150/1991) on a rolling bearing formed with a solid lubricating film made of polytetrafluoroethylene whose weight average molecular weight is not more than 5,000 (hereinafter referred to as PTFE (A) for brevity's sake).

PTFE heretofore used as a solid lubricant for rolling bearings has a weight average molecular weight of $1 \times 10^5$ or above, particularly $1 \times 10^6 - 1 \times 10^7$, but PTFE (A) has a remarkably low shear strength and soft, as compared with the heretofore used PTFE. For this reason, particles of PTFE (A) are superior in re-adherebility, entering any shallow dimples in the mating surface to act as lubricating powder to form a lubricating film and hence they hardly scatter. Further, since the shearing strength is low, the friction coefficient is low, developing superior lubrication performance. In the proceding patent application, PTFE (A) is used to form solid lubricating films on those portions of a rolling bearing which are subject to rolling friction or sliding friction, so that, as compared with the use of other solid lubricants, the durability and low dust production rate are greatly improved, meeting the requirement for high integration and in-line form in the recent semiconductor producing apparatus.

An object of the present invention is to further improve the low dust production rate of said rolling bearing with solid lubricant.

SUMMARY OF THE INVENTION

The present invention relates to a rolling bearing with solid lubricant wherein solid lubricating films made of PTFE (A) have a continuous island distribution comprising island film portions and connective film portions interconnecting the island film portions.

A solid lubricating film formed on the contact surface of a bearing part is worn by the mating surface to form fine particles. The fine particles re-adhere to the mating surface to form a re-adhered film. In this manner, solid lubricating films generally perform the lubricating function as they repeatedly perform separation from the surface and re-adhesion to the surface. Therefore, if the re-adherebility of particles is not sufficiently high, those particles which fail to re-adhere are discharged outside the bearing as dust.

The arrangement in which the solid lubricating film of PTFE (A) has continuous island distribution improves the re-adherebility of the particles scraped from the film surface, thereby further improving the low dust production rate.

Referring to FIGS. 6A and 6B, in a solid lubricating film 11a, island film portions 12 are interconnected by a thin connective film portion 15; thus, the surface of the solid lubricating film 11a has fine concaves and convexes, covering the surface of a mother material 11. The convex island film portions 12 produce particles 12a as they are scraped by contact with the mating surface 13. Such particles 12a enter the concave connective film portions 15 and re-adhere thereto. In this manner, the partcles 12a scraped from the surface of the solid lubricating film 11a re-adhere to the connective film portions 15 between the island film portions 12. In other words, they are arrested so as not to be discharged outside, which results in that production of dust is suppressed.

The function of the solid lubricating film 11a arresting the particles 12a is increased as compared with a solid lubricating film 21a of discontinuous island distribution as shown in FIGS. 7A and 7B or a solid lubricating film 31a of uniform distribution as shown in FIG. 8. The reason is that since the connective film portions 15 between the island film portions 12 are made of the same material as the particles 12a, and are concave, the particles 12a settle down more easily. In contrast, the lubricating film 21a of discontinuous island distribution has ground portions of the mother material 11 exposed between the island film portions 12, and the solid lubricating film 31a of uniform distribution has a flat surface; thus, in each case, the particle arresting function is somewhat low.

The arrangement in which the solid lubricating film made of PTFE (A) has an continuous island distribution remarkably improves the low dust producing rate of bearings. However, it sometimes occurs that in the early period of rotation of the bearing or after a passage of a fixed time, a relatively large amount of dust is produced.

The reason is that if the area percentage of the island film portions to the total area of the solid lubricating film is too large, the resulting increase in the area contacting with the mating surface produces excessive particles in the early period of operation of the bearing. Further, since the area percentage of the connective film portions to the total area of the solid lubricating film results in being decreased, the particle arresting function is not fully developed. On the other hand, if the area percentage of the island film portions is too small, excessive particles are not produced but, reversely, as the island film portions are abraded, the required amount of particles to develop the lubricating function is not supplied, so that after a passage of a fixed time, lubricability is more or less decreased.

Further, the function of arresting particles originates in the fact that the connective film portions between island film portions have a concave shape; thus, if the difference in the film thickness between the island film portions and the connective film portions is too small, the arresting effect of the connected film portions is decreased.

By putting the area percentage of the island film portions to the total area of the solid lubricating film in the range of 10%–80%, the production of particles can be suppressed and the area proportion of the connective film portions to effectively develop the particle arresting function is obtained, so that the low dust production rate is further improved.

Further, by setting the difference in the film thickness between the island film portions and the connective film portions at 0.2 μm or more, the particle arresting function of the connective film portions is effectively developed, thereby further improving the low dust production rate.

DESCRIPTION OF PREFERRED EMBODIMENTS

Embodiments of the present invention will now be described.

Figure 1A:
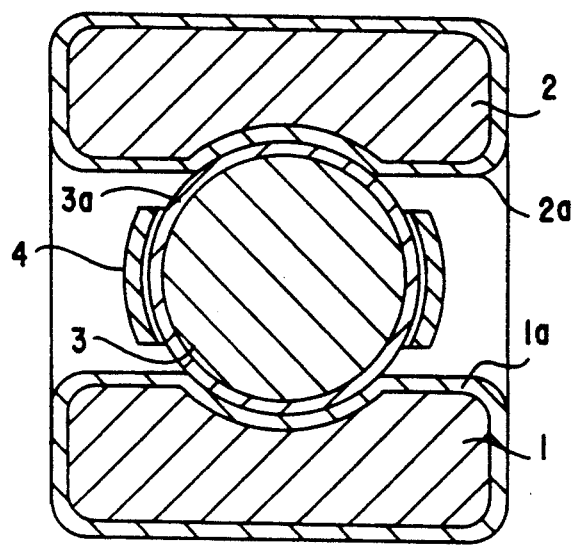
FIG. 1A shows a cross sectional view of a deep groove ball bearing which is an embodiment of the present invention.
Figure 2A:
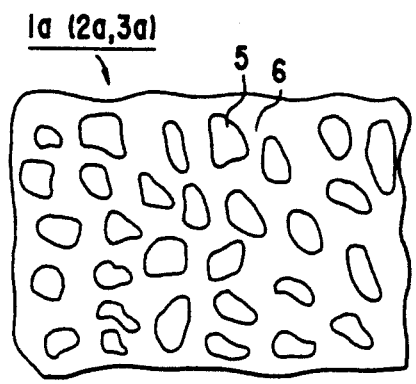
FIG. 2A shows a plan view schematically showing a solid lubricating film of continuous island distribution.
Figure 2B:
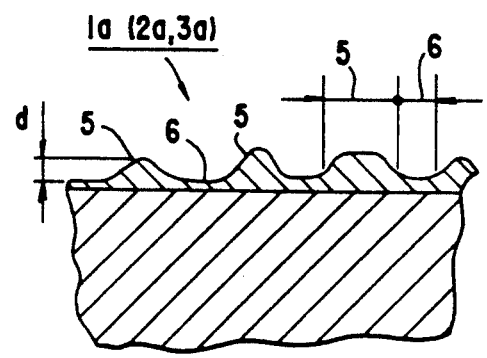
FIG. 2B shows a cross sectional view schematically showing the solid lubricating film of continuous island distribution.

An embodiment shown in FIG. 1A is one in which the present invention is applied to a deep groove ball bearing. This bearing is composed of such bearing parts as an inner ring 1, outer ring 2, a plurality of rolling elements 3 disposed between the inner ring 1 and the outer ring 2, and a cage 4 retaining the rolling elements 3 circumferentially at equal intervals. And the raceway surfaces of the inner ring 1 and the outer ring 2 and the surfaces of the rolling elements 3 are formed with solid lubricating films 1a, 2a and 3a, respectively, of PTFE having a weight average molecular weight of not more than 5,000 (hereinafter referred to as PTFE (A).). These solid lubricating films are formed by spraying PTFE (A) (for example, ARC7 produced by Japan Acheson Ltd, having a weight average molecular weight of not more than 5,000) on the intended surfaces of the bearing parts from a position 25 cm away to adhere thereto, and then, partly dissolving the deposits of PTFE (A) on the intended surfaces by a solvent such as acetone thereby connecting the island film portions 5 by the thin connective film portions 6 as shown FIGS. 2A and 2B.

Figure 7A:
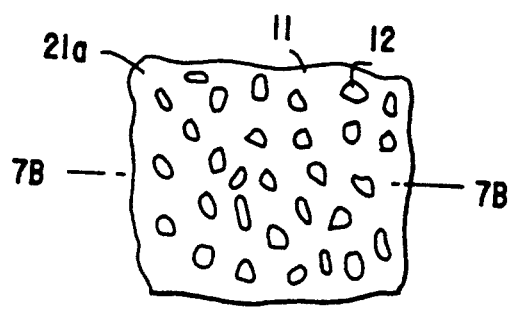
FIGS. 7A and 7B are a plan view and a cross sectional view schematically showing a solid lubricating film of conventional discontinuous island distribution.
Figure 7B:
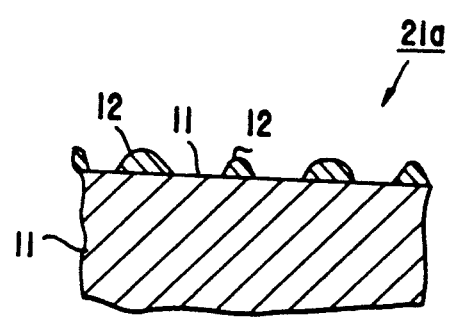
Figure 8:
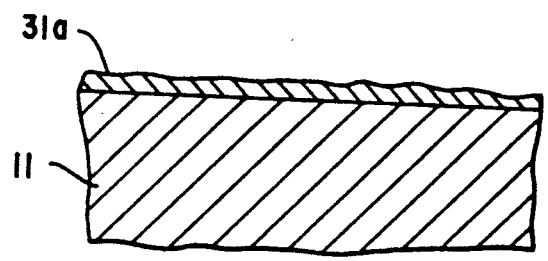
FIG. 8 is a cross sectional view schematically showing a solid lubricating film of conventional uniform distribution.

That is, a solution of PTFE (A) is sprayed onto the intended surfaces to form solid lubricating films of discontinuous island distribution as shown in FIGS. 7A and 7B, and then, the discontinuous island film portions being partly dissolved by the solvent to adhere to the ground areas of mother material portions between the island film portions, whereby adjacent island film portions are interconnected by thin connective film portions of PTFE (A).

The solid lubricating films 1a, 2a, 3a formed in this manner have a continuous island distribution in which crystalline PTFE (A) adhere to the intended surfaces. In this embodiment the average film thickness of the lubricating films 1a, 2a, 3a are about 0.6 μm, respectively.

The word "crystalline" as used herein refers to PTFE (A) retaining its crystal structure intact rather than dividing to molecular level as in the case of spattering process. As the crystal structure of PTFE (A) is maintained, the inherent lubricating property of PTFE (A) is also maintained.

In addition, in this embodiment, solid lubricating films have been formed on the raceway surfaces of the inner ring 1 and the outer ring 2 and the surfaces of the rolling elements 3; however, solid lubricating films may be formed at least on the surfaces of the rolling elements 3 or the raceway surfaces of the inner ring 1 and the outer ring 2.

Figure 1B:
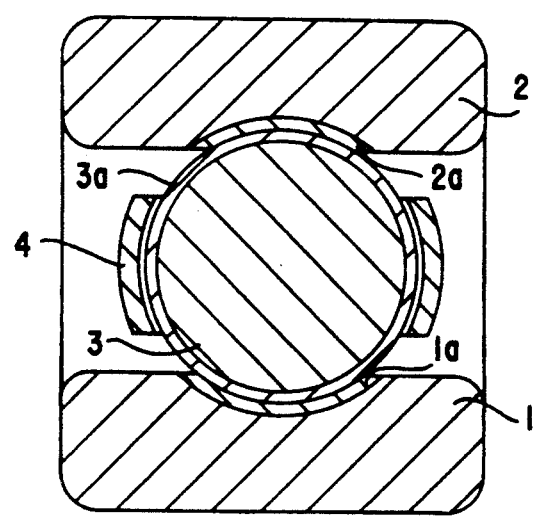
FIG. 1B shows a cross sectional view showing the state in which a fitting surface or the like is not formed with a solid lubricating film in FIG. 1A.

Further, in FIG. 1A, the entire surfaces of the inner ring 1 and the outer ring 2 are formed with solid lubricating films 1a and 2a; however, as shown in FIG. 1B, those portions, such as fitting surface, which do not require solid lubricating films to be formed thereon may be prevented from being formed with them by masking or may have them removed before the bearing becomes a final product.

Further, the type of the bearing is not limited to the deep groove ball bearing shown in FIGS. 1A and 1B but is applicable to rolling bearings in general.

Recently, in the semiconductor production field, from the standpoint of apparatus maintenance and productivity in addition to said high integration degree and in-line form, there is a tendency to make the apparatus more compact and along with this, the bearings used in the semiconductor producing apparatus (for example, wafer transfer apparatus) also tend to be reduced in size.

Figure 3:
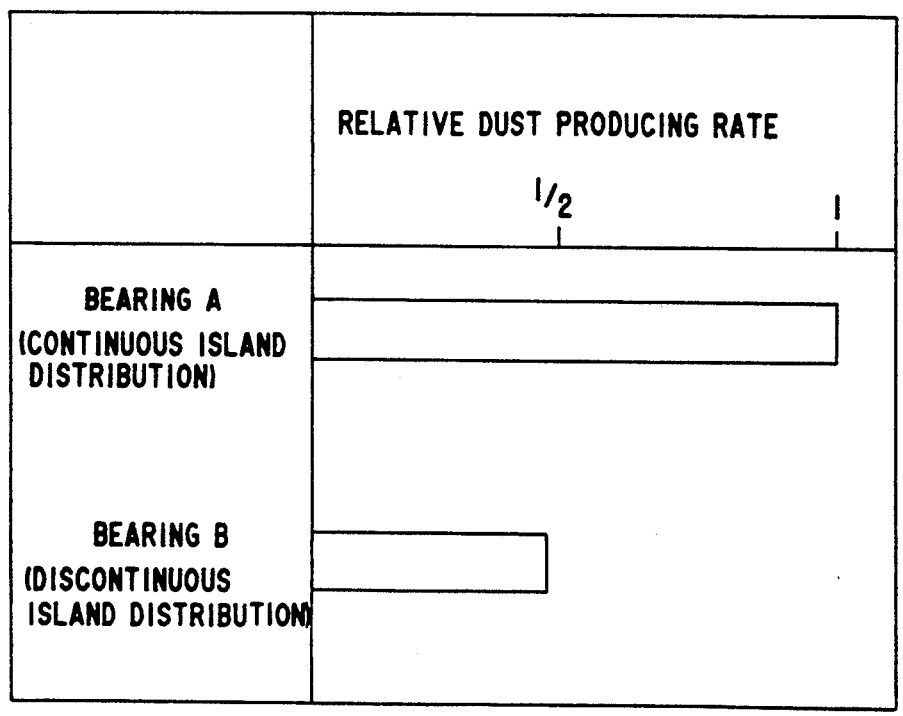
FIG. 3 shows the result of a dust production test conducted on a rolling bearing (bearing B) of the present invention and a rolling bearing (bearing A) formed with a solid lubricating film of discontinuous island distribution.

FIG. 3 shows the result of a dust production test conducted on a small-diameter bearing (having a continuous island distribution; area percentage of the island film portions to the total area of the solid lubricating film $\alpha = 80\%$; referred to as a bearing B) and a small-diameter bearing not treated with the solvent (having a discontinuous island distribution; referred to as a bearing A). The dust production test was performed by setting sample bearings in a measurring device and while rotating these under predetermined conditions, the amount of particles discharged from the bearings is measured by a dust detector (of the type using a sensor which uses laser for counting) disposed immediately below the sample bearings. As shown in FIG. 3, by arranging the solid lubricating film in continuous island distribution, the relative dust production rate of the bearing B is not more than ½ of the relative dust production rate of the bearing A. Although the film forming area decreases with the decreasing diameter of the bearing, the dust production rate of the bearing can be decreased by forming a solid lubricating film of continuous island distribution by using PTFE whose weight average molecular weight is not more than 5,000.

Figure 4:
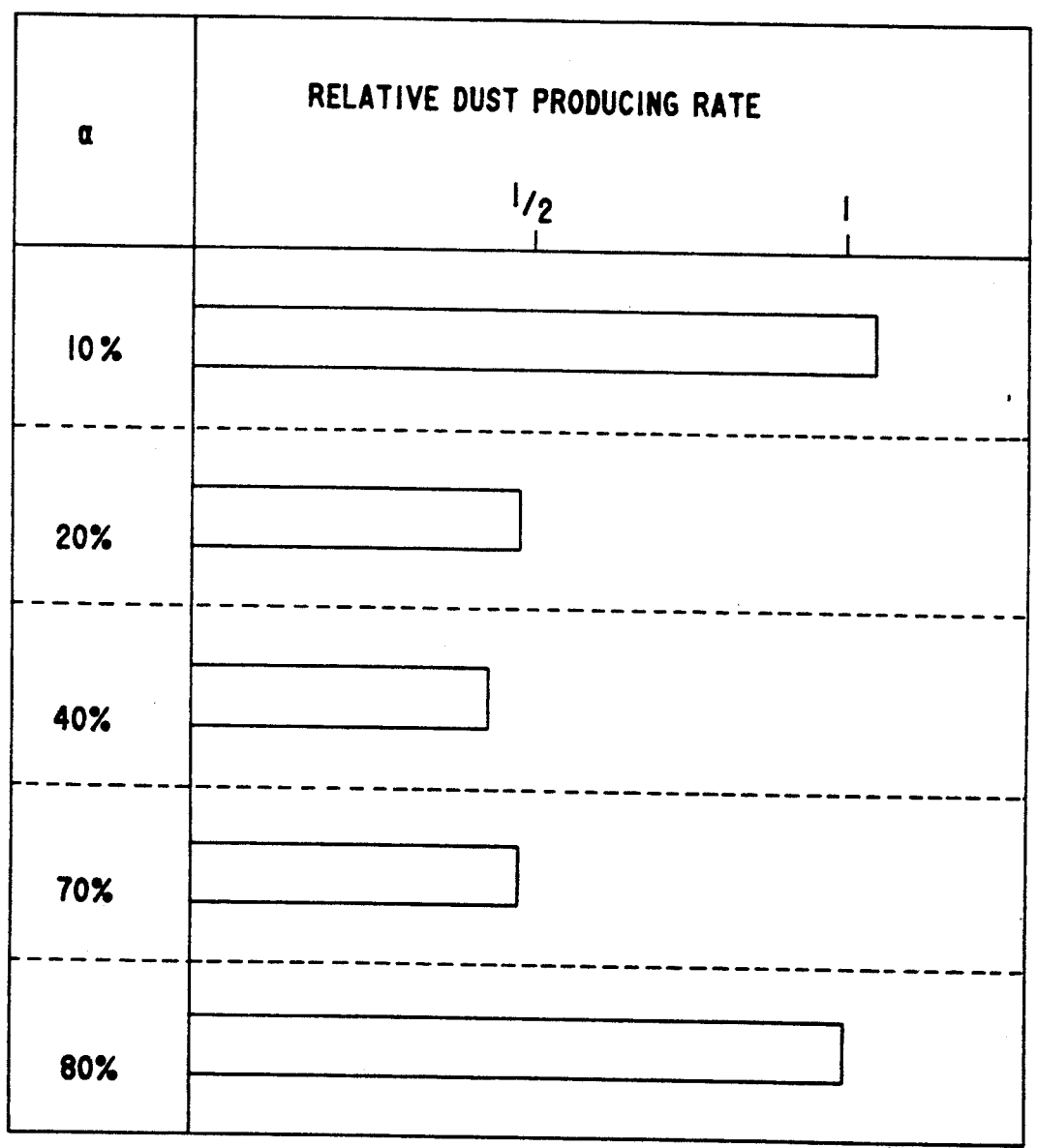
FIG. 4 shows the result of a dust production test conducted on rolling bearings differing in the area percentage α of the island film portions of the solid lubricating film.

FIG. 4 shows the result of a dust production test conducted on rolling bearings which differ in the area percentage $\alpha$ of the island film portions 5. In addition, the rolling bearings used have the same arrangement as that shown in FIG. 1B and the film thickness difference d between the island film portions 5 and the connective film portions 6 is not less than 0.2 $\mu$m on the average. As shown in FIG. 4, when the area percentage of the island film portions is 10% or 80%, the dust production rate of the bearing is relatively high, but when it is in the range of 20%–70%, the dust production rate of the bearing is decreased to less than ½ of the dust production rate of the bearing of the area percentage $\alpha$ being 10% or 80%. Also, the time-dependent change in the dust production rate of the bearings shows that when the area percentage $\alpha$ is not more than 10%, the dust production rate increases in the later period of the test and that when the area percentage $\alpha$ is not less than 80%, it increases in the early period of the test. This is due to the facts that if the area percentage $\alpha$ is too larger, excessive particles are produced in the early period of the operation of bearing and the particle arresting effect of the connective film portions 6 is not fully developed and that if the area percentage $\alpha$ is too small, the necessary amount of particles to develop the lubricating effect is not supplied with the lapse of time. Therefore, it can be said that the area percentage $\alpha$ should desirably be in the range of 20%–70% in order to decreases the dust production rate.

Figure 5:
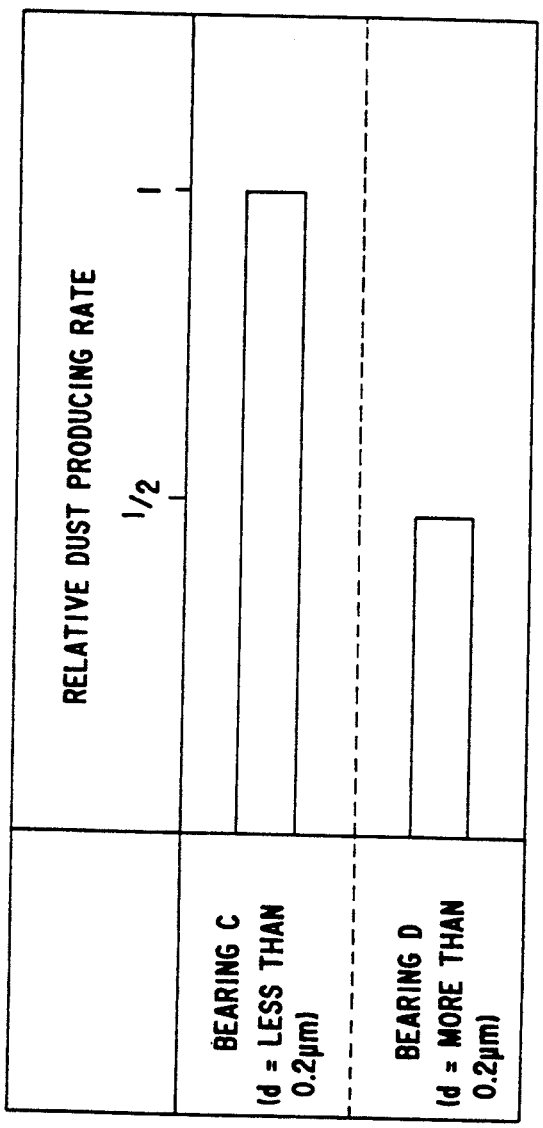
FIG. 5 shows the result of a dust production test conducted on rolling bearings C and D differing in the film thickness difference d between the island film portions and the connective film portions of the solid lubricating film.
Figure 6B:
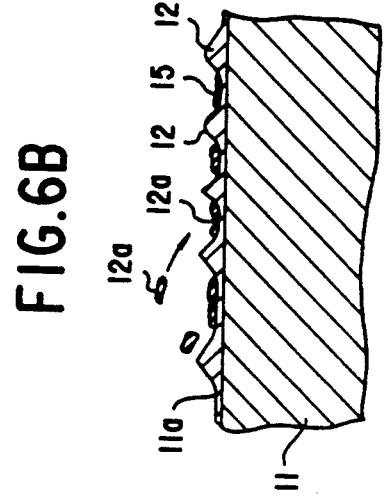
FIGS. 6A and 6B are cross sectional views schematically showing the machanism by which particles are arrested in a solid lubricating film of continuous island distribution.
Figure 6A:
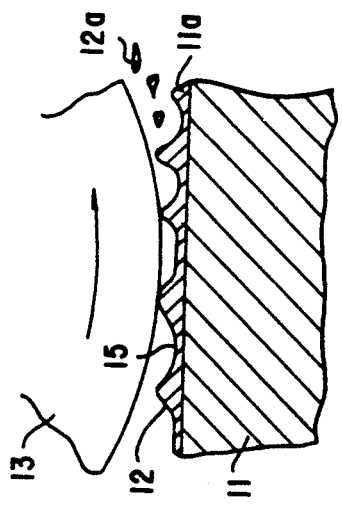

FIG. 5 shows the result of a dust production test conducted on bearings C and D which differ in the film thickness difference d between the island film portions 5 and the connective film portions 6. In addition, the rolling bearings used have the same arrangement as that shown in FIG. 1B, and the bearing C has a film thickness difference d of not more than 0.2 $\mu$m (the island film portions; 0.2 $\mu$m, the connective film portions; 0.05 $\mu$m) and the bearing D has a film thickness difference d of not less than 0.2 $\mu$m (the island film portions; 0.3 $\mu$m, the connective film portions; 0.05 $\mu$m), the area percentage $\alpha$ being 40% in each case. As shown in FIG. 5, the bearing D has its dust production rate decreased to not more than ½ of that of the bearing C. This is due to the fact that unless the film thickness difference d is not less than 0.2 $\mu$m, the particle arresting effect of the connective film portions 6 cannot be fully developed.

As has so far been described, by arranging the solid lubricating film of PTFE (A) in continuous island distribution, the production of particles is suppressed and particles produced are arrested by the connective film portions between the island film portions; therefore, the dust production rate of the bearing is minimized.

Further, by the arrangement in which the area percentage of the island film portions to the total area of the solid lubricating film is in the range of 10%–80%, the production of particles is suppressed and the area percentage of the connective film portions having the particle arresting function is secured, so that the low dust production rate of the bearing is further improved.

Further, by the arrangement in which the film thickness difference between the island film portions and the connective film portions is not less than 0.2 $\mu$m, the particle arresting effect is efficiently developed in the connective film portions, so that the low dust production rate is further improved.

What is claimed is:

1. A rolling bearing with solid lubricant wherein at least one of the bearing parts composing of said rolling bearing has a solid lubricating film,
   said solid lubricating film being formed at least on a surface of said bearing part which are subject to rolling friction or sliding friction,
   said solid lubricating film being formed of polytetrafluoroethylene whose weight average molecular weight is not more than 5,000,
   and said solid lubricating film has a continuous island distribution comprising island film portions and connective film portions interconnecting said island film portions.

2. A rolling bearing with solid lubricant as set forth in claim 1, wherein each rolling element has said solid lubricating film.

3. A rolling bearing with solid lubricant as set forth in claim 2 used in a semiconductor producing apparatus.

4. A rolling bearing with solid lubricant as set forth in claim 1, wherein a inner ring and a outer ring have said solid lubricating film.

5. A rolling bearing with solid lubricant as set forth in claim 4 used in a semiconductor producing apparatus.

6. A rolling bearing with solid lubricant as set forth in claim 1, 2 or 4 wherein the area percentage of said island film portions to the total area of said solid lubricating film is in the range of 10%–80%.

7. A rolling bearing with solid lubricant as set forth in claim 6 used in a semiconductor producing apparatus.

8. A rolling bearing with solid lubricant as set forth in claim 1, 2 or 4 wherein the average film thickness difference between said island film portions and said connective film portions is not less than 0.2 $\mu$m.

9. A rolling bearing with solid lubricant as set forth in claim 8 used in a semiconductor producing apparatus.

10. A rolling bearing with solid lubricant as set forth in claim 1, 2 or 4 wherein the area percentage of said island film portions to the total area of said solid lubricating film is in the range of 10%–80% and the average film thickness difference between said island film portions and said connective film portions is not less than 0.2 $\mu$m.

11. A rolling bearing with solid lubricant as set forth in claim 10 used in a semiconductor producing apparatus.

12. A rolling bearing with solid lubricant as set forth in claim 1 used in a semiconductor producing apparatus.

* * * * *